R. F. DOWNEY.
COIN CONTROLLED GAME APPARATUS.
APPLICATION FILED NOV. 14, 1905.
912,654.
Patented Feb. 16, 1909.
5 SHEETS—SHEET 5.
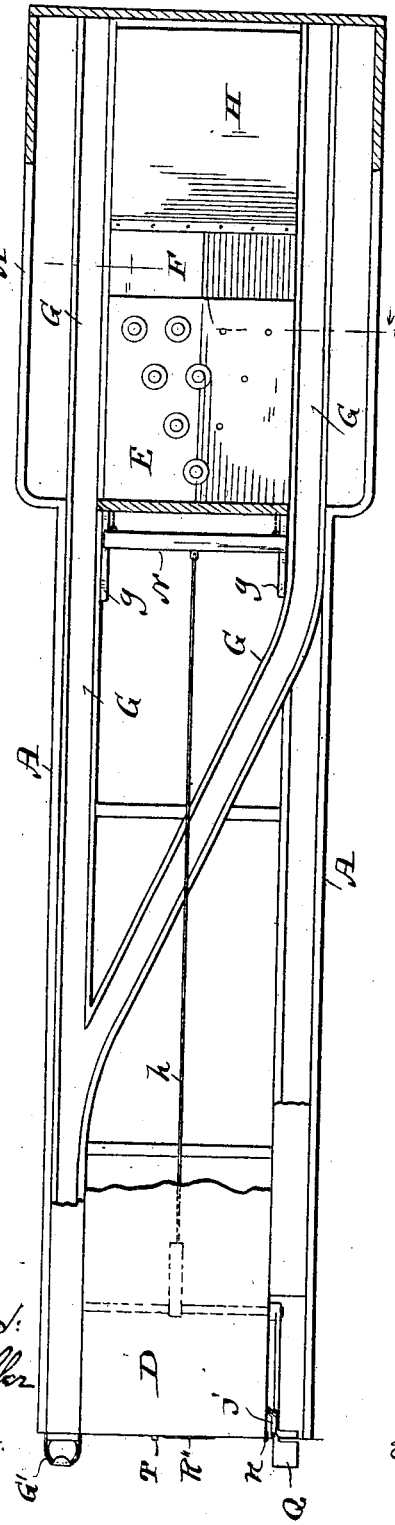
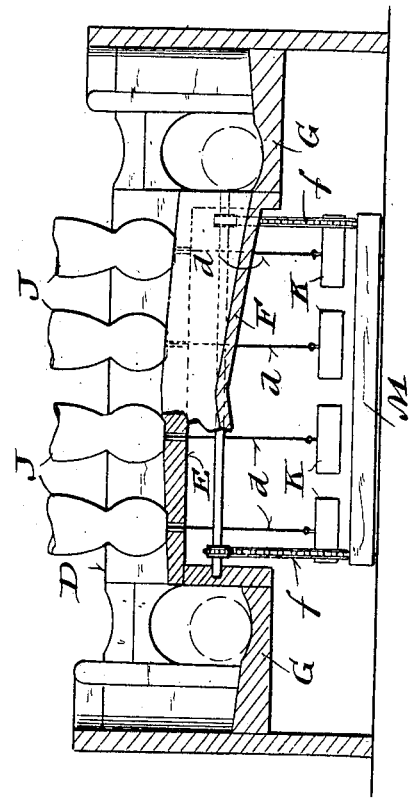

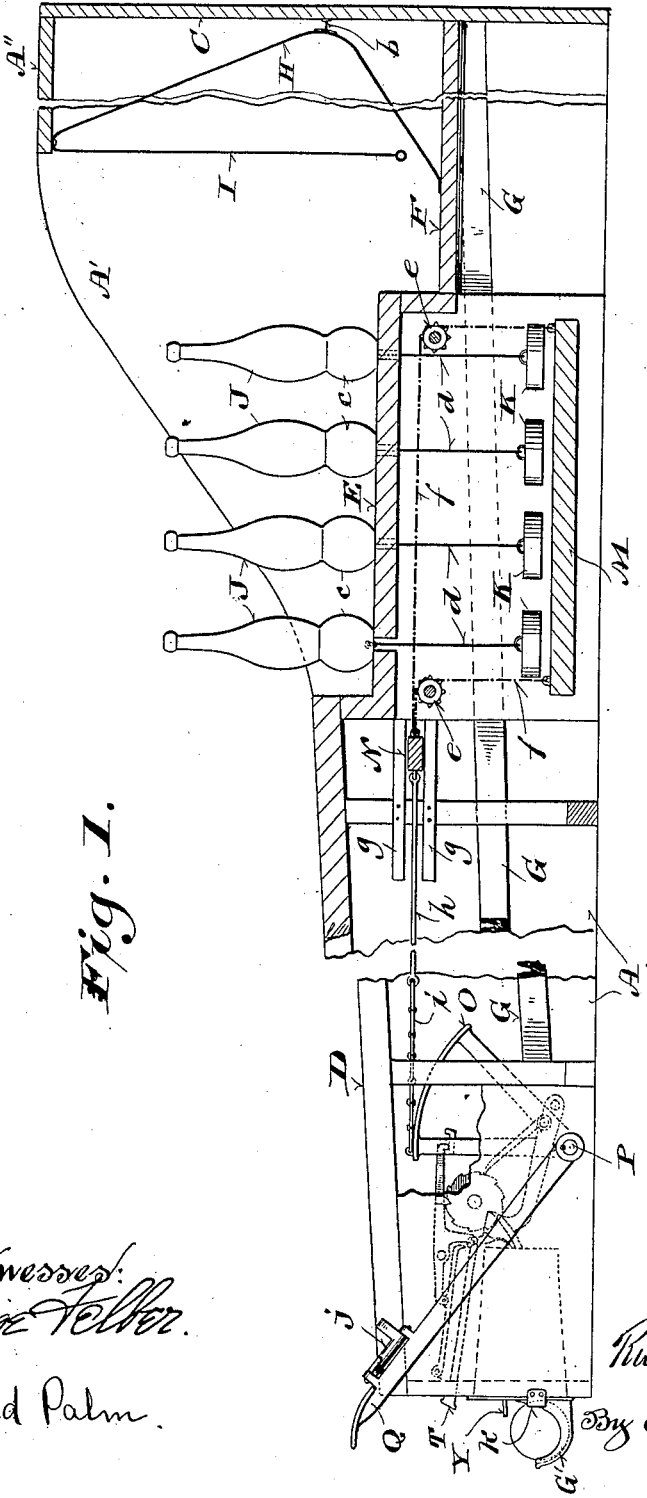

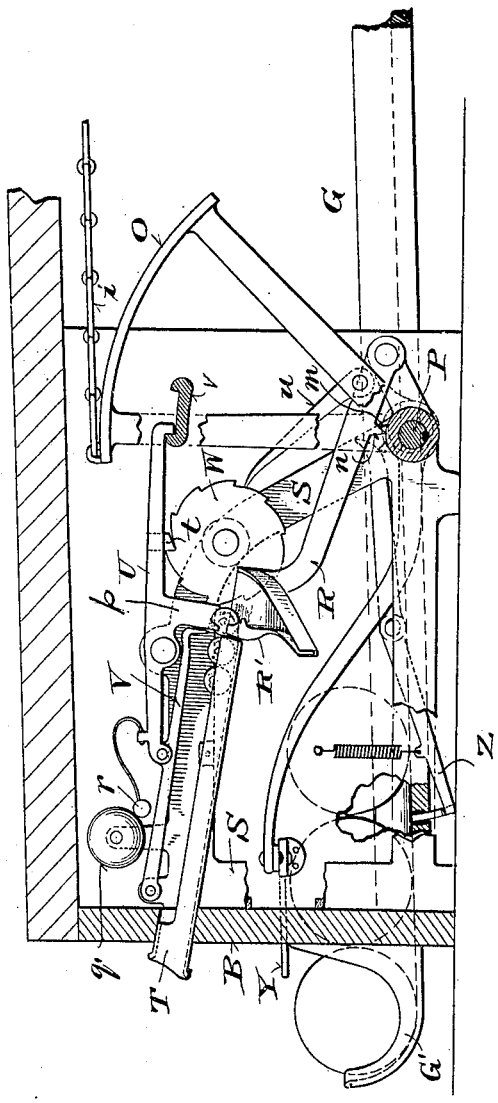

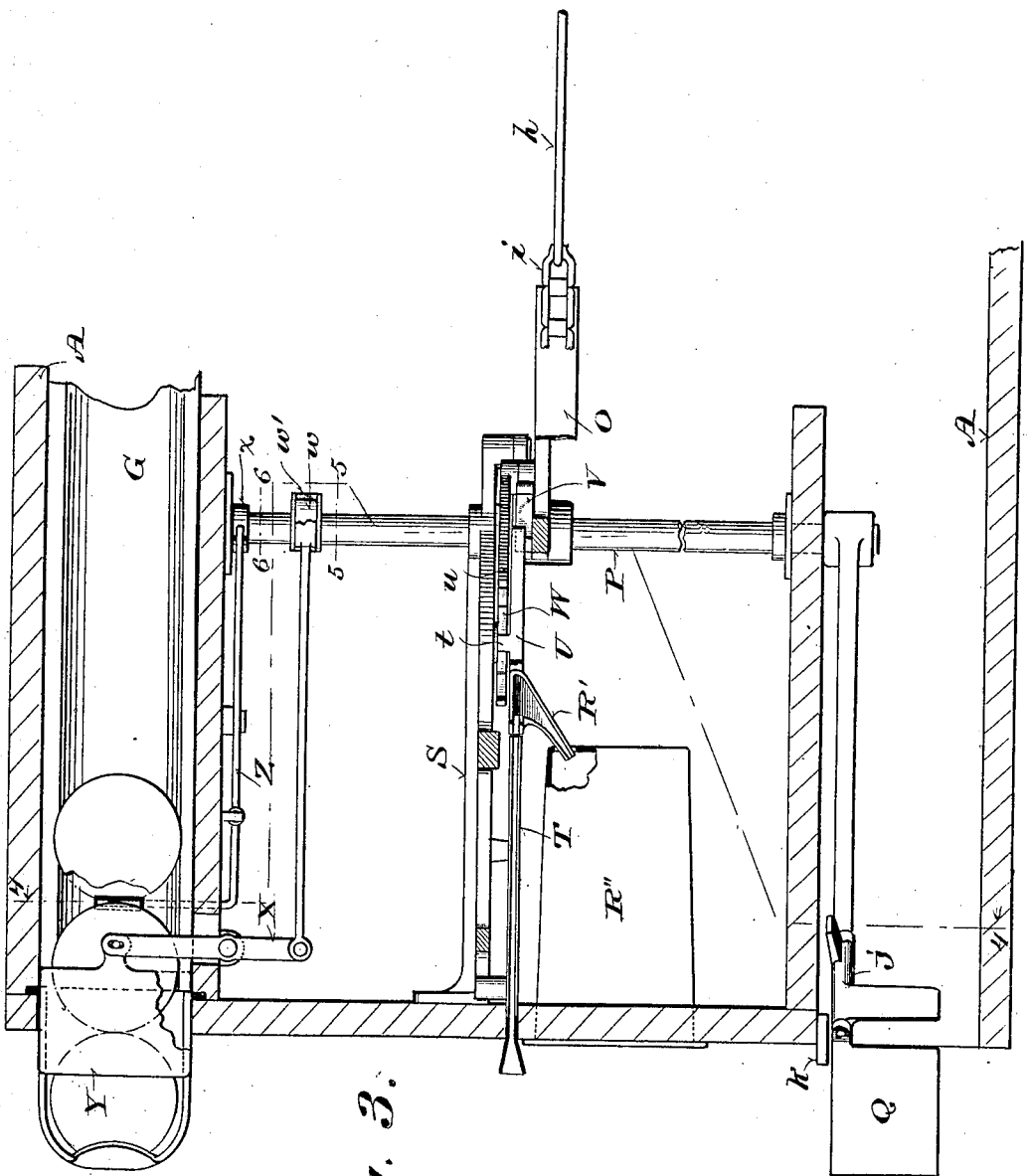

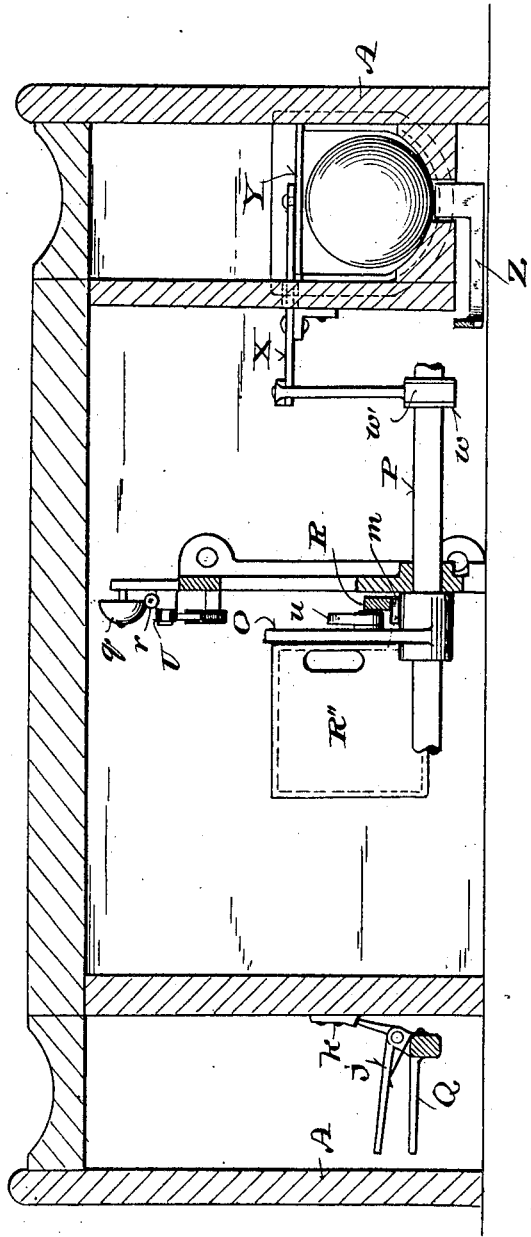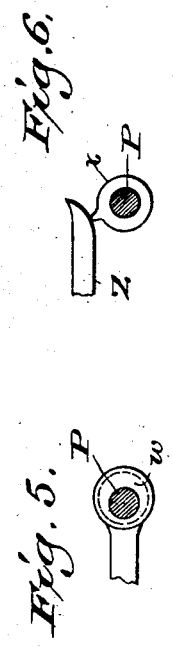

UNITED STATES PATENT OFFICE.

RICHARD F. DOWNEY, OF MILWAUKEE, WISCONSIN, ASSIGNOR TO THE AUTOMATIC PORTABLE BOWLING ALLEY COMPANY, A CORPORATION OF MICHIGAN.

COIN-CONTROLLED GAME APPARATUS.

No. 912,654.          Specification of Letters Patent.          Patented Feb. 16, 1909.

Application filed November 14, 1905. Serial No. 287,253.

*To all whom it may concern:*

Be it known that I, RICHARD F. DOWNEY, a citizen of the United States, and resident of Milwaukee, in the county of Milwaukee and State of Wisconsin, have invented certain new and useful Improvements in Coin-Controlled Game Apparatus; and I do hereby declare that the following is a full, clear, and exact description thereof.

My invention consists in certain peculiarities of construction and combination of parts hereinafter particularly set forth with reference to the accompanying drawings and subsequently claimed, its object being to provide simple, economical and compact coin controlled apparatus for bowling games, said apparatus being especially designed for use in places of public resort where space is limited and extra help undesirable.

Figure 1 of the drawings represents a side elevation of my improved game apparatus partly broken away and in section; Fig. 2, a vertical longitudinal section of a fragment of the apparatus; Fig. 3, a horizontal section view of said fragment, parts therein being broken away; Fig. 4, a vertical transverse section view of said apparatus indicated by lines 4—4 in Fig. 3; Figs. 5 and 6 detail views partly in section on lines 5—5 and 6—6 respectively in said Fig. 3; Fig. 7, a plan view of the aforesaid apparatus partly broken away, and Fig. 8, a transverse section view indicated by line 8—8 in Fig. 7.

Referring by letter to the drawings, A indicates the sides, B, C, the ends and D, E, F, top-sections of a box-like casing, said sides being offset at the rear and upwardly extended. At the rear of the casing, its end C, upward extensions A' and an over-hang A" combine to constitute a hood.

The top-section D of the casing is shown as being preferably inclined upward toward the rear, and it constitutes the roll-way of the game-apparatus. The top-sections E, F, are at different elevations below the rear end of the roll-way and serve respectively as a pin-stand and bottom of a ball-pit.

Between the pin-stand and ball-pit and the upward extensions of the offset rear ends of the casing-sides are the rear open ends of a pair of ball-returns G that have pitch towards the front under the pin-stand and roll-way of the apparatus, one of the ball-returns being made to have junction with the other, so that all the balls caught in both returns have their outlet at the front end of that one of the same that is parallel throughout its length with a side of the casing, as is clearly illustrated in Fig. 7.

The pin-stand E and the bottom of the ball-pit are both inclined from the center downward toward the open ends of the ball-returns and any ball stopped in its flight on said stand or in said pit will, by gravity, find its way into one or the other of said returns. Suspended in the hood aforesaid is a shield H of canvas or other suitable material that rests at its lower end on the bottom of the ball-pit and is attached, by flexible straps $b$, to the rear end of C of the casing. Hung in the hood, forward of the shield H, is a swing curtain I also of canvas or other suitable material. The curtain serves as a yielding buffer for balls that have sufficient impetus to reach the same, and these balls fall onto the bottom of the pit aforesaid, there being a yield of said shield to the balls striking the same. The curtain and shield aforesaid serve as noiseless fenders for the balls. Pins J, bulbous at their lower ends, have their support on the stand E aforesaid, and when in vertical position, the lower bulb portion $c$ of each is below the rear end of the aforesaid roll-way, the appearance from the front being that of an ordinary bowling-pin in standing position. Attached to the lower bulbous end of each pin, central of the same, is a flexible hanger $d$ for a weight K, by which said pin is held in standing position.

Loose on stay-rods L, in the casing, are sprocket-wheels $e$ for chains $f$ that connect with corners of a scaffold M under the pin-weights, and the chains are also connected to a sliding bar N for which guide-ways $g$ are provided in said casing. The bar N is attached at its center to a link $h$ in connection with a chain $i$, that in turn is attached to the rim of a sector O fast on a shaft P for which the casing is provided with bearings, and the normal position of the sector is such that the scaffold M is suspended out of touch with the weights K by which the pins J are automatically set in vertical position. One end of the shaft P is fast in a lever in the form of a treadle Q that extends out at the front of the casing and is provided with a spring-controlled rocker-latch $j$ for engagement with a stop $k$ provided in the casing.

The hub of the sector is provided with a tapered lug m that is normally against a corresponding lug n of a tilt-lever R fulcrumed in connection with an arm of a bracket S provided in the casing, this bracket also serving as one of the bearings for the sector-shaft. Extending laterally from the free end of the lever R is a coin-tray R', the discharge-end of which has play in a slot of a coin-box R'' accessible at the front of the casing. A coin-notch in a flange of the tray R' registers with the inner end of a coin-chute T supported in connection with the bracket S and extended through the front of the casing. Depending from a trip-lever U, fulcrumed in connection with the bracket S, is a notched lug p that constitutes a stop in the path of a coin that is also caught in the tray-notch, and in pivotal connection with said bracket and lever U is another coin-stop V that is normally clear of the lower end of the coin-chute T aforesaid. A bell q or other suitable signal-device is preferably provided in connection with the bracket S, and a striker r or other actuating device for the signal is put in connection with the coin-stop V above specified. The lever U is provided with a detent-lug t that engages a ratchet-wheel W supported on a stud of the bracket S, and a pawl u in connection with the sector O also engages the ratchet-wheel, this wheel being shown as having ten notches, one of which is deeper than the others and with which the detent is normally engaged. A hook-end of the lever U is caught in a recessed lateral lug v of the sector O when the detent-lug of said lever has engagement with the deep notch of the ratchet-wheel.

The shaft P is shown provided with an eccentric w having the strap w' thereof linked to one end of a lever X fulcrumed in connection with a support provided in the casing, and the other end of the lever has play connection with a slide Y that normally projects outward from said casing over a ball-receptacle G' in register with the front end of the ball-return that is parallel throughout its length to a side of the casing. A cam x fast on the shaft P opposes a spring-controlled crooked lever Z fulcrumed in connection with the bracket S, and the forward upwardly extended end of this lever has play through the bottom of the main ball-return to constitute a ball-stop.

The apparatus, as herein shown, is organized for the game of ten-pins and the movable parts of said apparatus appear in normal position, the play of the treadle Q being limited by the lever U in engagement with the lug v of the sector O fast to the shaft P to which said treadle is also fastened and this play is insufficient to permit a movement of the ratchet-wheel W by the pawl u engaging the same.

A coin of the proper denomination or a slug of dimensions corresponding to such coin being deposited in the chute T and caught in the flange-notch of the tray R' and the notch of the stop p depending from the lever U, a depression of the treadle Q will result in a lift of the coin or slug bridged levers R, U, and a clearance of the sector-lug v by the latter lever. At the same time the deep-notch of the ratchet-wheel is cleared by the detent lug t of lever U, and the stop V is depressed to come in opposition to the delivery end of the aforesaid chute. Continued depression of the treadle Q results in a lift of the scaffold M to elevate the opposing weights K and thereby slacken the flexible connection between the pins J and said weights. During the descent of the treadle, the ratchet-wheel W is moved one notch, the slide Y is retracted to permit the removal of the ball in the receptacle G' and the cam x of shaft P clears the lever Z, whereupon the spring, controlling said lever, has retraction to lift the stop-end of the same into the path of returned balls, the disposition of the ball-stop being such that only two balls can be taken from the apparatus subsequent to a full depression of said treadle that is held in its depressed position by an engagement of its rocker-latch j in engagement with the stop k aforesaid. A frame of the game can now be rolled by a player, and this being done the treadle Q is raised and lowered to permit an automatic reset of the pins J, and subsequent lift of their weights, release of two balls accessible to the player and a movement of the ratchet-wheel W one more notch. The apparatus is now in condition for the playing of another frame of the game. After each frame of the game is rolled the treadle Q is returned to normal position, again depressed its full throw and latched, these operations being continued until the deep-notch of the ratchet-wheel W is again engaged by the detent-lug t of the lever U and this lever caught in the sector-lug v to lock the apparatus until such time as a proper coin or slug is caught in position to bridge the levers R and U aforesaid. When the lever U is returned to normal position the aforesaid signal is actuated to indicate the locking of said lever.

The hood, yielding ball-stop, yielding ball shield, specific form of pins and means for controlling release of a predetermined number of returned balls at the approach end of the alley herein disclosed have been divided out of this application and claimed in my divisional application Serial No. 454,471, filed September 23, 1908.

I claim:

1. In a game-apparatus, a lever controlled shaft, a catch in connection with the shaft, a trip-lever engageable with the catch and provided with coin-stop and detent lugs, a ratchet-wheel having one notch deeper than the remaining notches thereof and engageable with the detent-lug of the trip-lever, a tilt-lever having a coin or slug notch in register with the coin-stop lug of said trip-lever, a ratchet-pawl, and means in connection with the shaft for actuating the tilt-lever and pawl, the aforesaid trip-lever being disengaged from its catch when said coin-stop lug and tilt-lever are coin or slug-bridged.

2. In a game-apparatus, a lever controlled shaft, a catch in connection with the shaft, a trip-lever engageable with the catch and provided with coin-stop and detent lugs, a ratchet-wheel having one notch deeper than the remaining notches thereof and engageable with the detent-lug of the trip-lever, a tilt lever having a coin or slug notch in register with the coin-stop lug of said trip-lever, a ratchet-pawl controlled by said shaft, means in connection with the shaft for actuating the aforesaid trip-lever that is freed from its catch when said coin-stop lug and tilt-lever are coin or slug bridged, a slide, a spring-controlled stop, and slide and stop actuating means in conjunction with the aforesaid shaft.

3. In a game-apparatus, a lever controlled shaft, a catch in connection with the shaft, a trip-lever engageable with the catch and provided with coin-stop and detent lugs, a ratchet-wheel having one notch deeper than the remaining notches thereof and engageable with the detent-lug of the trip-lever, a tilt lever having a coin or slug notch in register with the coin-stop lug of said trip-lever, means in conjunction with the shaft for actuating the tilt-lever, the trip-lever being disengaged from its catch when said coin-stop lug and tilt-lever are coin or slug bridged, a ratchet-pawl controlled by said shaft, a signal-device, and a signal actuating device in conjunction with the aforesaid trip-lever.

4. In a game-apparatus, a lever controlled shaft, a catch in connection with the shaft, a trip-lever engageable with the catch and provided with coin-stop and detent lugs, a ratchet-wheel having one notch deeper than the remaining notches thereof and engageable with the detent-lug of the trip-lever, a tilt-lever having a coin or slug notch in register with the coin-stop lug of said trip-lever, means in conjunction with the shaft for actuating the tilt-lever, the trip-lever being disengaged from its catch when said coin-stop lug and tilt-lever are coin or slug bridged, a ratchet-pawl controlled by said shaft, and a coin cut-off coöperative with the aforesaid trip-lever back of the bridging point.

In testimony that I claim the foregoing I have hereunto set my hand at Milwaukee in the county of Milwaukee and State of Wisconsin in the presence of two witnesses.

RICHARD F. DOWNEY.

Witnesses:
H. E. OLIPHANT,
GEORGE FELBER.